United States Patent
Nashiki et al.

(10) Patent No.: US 8,467,005 B2
(45) Date of Patent: Jun. 18, 2013

(54) TRANSPARENT CONDUCTIVE FILM, METHOD FOR PRODUCTION THEREOF AND TOUCH PANEL THEREWITH

(75) Inventors: Tomotake Nashiki, Ibaraki (JP); Hideo Sugawara, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 0 days.

(21) Appl. No.: 13/030,598

(22) Filed: Feb. 18, 2011

(65) Prior Publication Data

US 2011/0135892 A1 Jun. 9, 2011

Related U.S. Application Data

(63) Continuation of application No. 12/015,006, filed on Jan. 16, 2008.

(30) Foreign Application Priority Data

Jan. 18, 2007 (JP) .................................. 2007-009295
Aug. 30, 2007 (JP) .................................. 2007-224232

(51) Int. Cl.
*G02F 1/1335* (2006.01)
(52) U.S. Cl.
USPC .......................................................... 349/12
(58) Field of Classification Search
USPC .......................................................... 349/12
See application file for complete search history.

(56) References Cited

U.S. PATENT DOCUMENTS

| | | | |
|---|---|---|---|
| 5,354,497 A * | 10/1994 | Fukuchi et al. | 252/299.01 |
| 6,720,955 B2 | 4/2004 | Sugawara et al. | |
| 6,743,476 B2 | 6/2004 | Hishida | |
| 7,456,927 B2 * | 11/2008 | Kim | 349/187 |
| 7,534,500 B2 | 5/2009 | Kobayashi et al. | |
| 2002/0158853 A1 | 10/2002 | Sugawara et al. | |
| 2003/0037843 A1 | 2/2003 | Hishida | |
| 2003/0134122 A1* | 7/2003 | Wickboldt et al. | 428/411.1 |
| 2003/0194551 A1 | 10/2003 | Sasa et al. | |
| 2004/0265602 A1 | 12/2004 | Kobayashi et al. | |
| 2005/0083307 A1 | 4/2005 | Aufderheide et al. | |
| 2006/0040067 A1* | 2/2006 | Culp et al. | 427/569 |
| 2006/0232735 A1* | 10/2006 | Hokazono et al. | 349/122 |
| 2007/0126707 A1 | 6/2007 | Jones | |

(Continued)

FOREIGN PATENT DOCUMENTS

| | | |
|---|---|---|
| CN | 1395138 A | 2/2003 |
| JP | 63-304520 A | 12/1988 |

(Continued)

OTHER PUBLICATIONS

Japanese Office Action dated Oct. 14, 2010, issued in corresponding Japanese Patent Application No. 2008-000700.

(Continued)

*Primary Examiner* — Timothy L Rude
(74) *Attorney, Agent, or Firm* — Westerman, Hattori, Daniels & Adrian, LLP

(57) ABSTRACT

A transparent conductive film includes: a transparent film substrate; a transparent conductor layer provided on one or both sides of the transparent film substrate; and at least one undercoat layer interposed between the transparent film substrate and the transparent conductor layer; wherein: the transparent conductor layer is patterned; and a non-patterned portion not having the transparent conductor layer has the at least one undercoat layer.

20 Claims, 3 Drawing Sheets

U.S. PATENT DOCUMENTS

| | | |
|---|---|---|
| 2007/0236618 A1 | 10/2007 | Maag et al. |
| 2008/0138589 A1 | 6/2008 | Wakabayashi et al. |
| 2010/0112195 A1 | 5/2010 | Kodas et al. |

FOREIGN PATENT DOCUMENTS

| | | |
|---|---|---|
| JP | 7-209514 A | 8/1995 |
| JP | 2000-301648 A | 10/2000 |
| JP | 2002-326301 A | 11/2002 |
| JP | 2003114762 A | 4/2003 |
| JP | 2003-297150 I | 10/2003 |
| JP | 2006-202756 A | 8/2006 |
| JP | 2007-272259 A | 10/2007 |
| JP | 2008-98169 A | 4/2008 |
| TW | 200527304 A | 8/2005 |
| WO | 03-032332 A1 | 4/2003 |
| WO | 2006/126604 A1 | 11/2006 |

OTHER PUBLICATIONS

Japanese Office Action mailed Feb. 9, 2011, issued in corresponding Japanese Patent Application No. 2011-002368.
Taiwanese Office Action dated May 25, 2011, issued in corresponding Taiwanese Patent Application No. 097101511. English Translation.
Korean Office Action date Apr. 11, 2011, issued in corresponding Korean Patent Application No. 2008-0004082. English Translation.
Japanese Office Action dated May 6, 2011, issued in corresponding Japanese Patent Application No. 2011-002368. English Translation.
US Non-Final Office Action dated Mar. 25, 2011, issued in related U.S. Appl. No. 12/015,006.
US Non-Final Office Action dated Jun. 6, 2011, issued in related U.S. Appl. No. 13/030,613.
US Non-Final Office Action dated May 23, 2011, issued in related U.S. Appl. No. 13/030,621.
US Non-Final Office Action dated Jun. 1, 2011, issued in related U.S. Appl. No. 13/030,629.
Chinese Office Action dated Apr. 28, 2012, issued in corresponding Chinese Patent Application No. 2011100430077.3, with English translation, (8 pages).
Korean Office Action dated Oct. 24, 2011, issued in corresponding Korean Patent Application No. 10-2011-0010359. English Translation.
Korean Office Action dated Oct. 24, 2011, issued in corresponding Korean Patent Application No. 10-2011-0010360. English Translation.
Korean Office Action dated Oct. 24, 2011, issued in corresponding Korean Patent Application No. 10-2011-0010361. English Translation.
Korean Office Action dated Oct. 24, 2011, issued in corresponding Korean Patent Application No. 10-2011-0010362. English Translation.
Submission of Information dated Jun. 1, 2012, issued in corresponding Japanese Patent Application No. 2011-002343, with English translation (21 pages).
Submission of Information dated Jun. 1, 2012, issued in corresponding Japanese Patent Application No. 2011-002349, with English translation (16 pages).
Submission of Information dated Jun. 1, 2012, issued in corresponding Japanese Patent Application No. 2011-002380, with English translation (14 pages).
Extended European Search Report dated Sep. 27, 2012, issued in corresponding European Patent Application No. 11000663.2 (7 pages).
Extended European Search Report dated Sep. 27, 2012, issued in corresponding European Patent Application No. 11000666.5 (7 pages).
Extended European Search Report dated Sep. 27, 2012, issued in corresponding European Patent Application No. 11000665.7 (7 pages).
Chinese Office Action dated Feb. 2, 2012, issued on corresponding Chinese Patent Application No. 201110043080.5.
Chinese Office Action dated Dec. 24, 2012, issued in corresponding Chinese Patent Application No. 201110043077.3, with English translation (9 pages).
Japanese Office Action dated Aug. 3, 2012, issued in corresponding Japanese Patent Application No. 2011-002380, with English translation (14 pages).
Japanese Office Action dated Aug. 3, 2012, issued in corresponding Japanese Patent Application No. 2011-002343, with English translation (23 pages).
Extended European Search Report dated Sep. 13, 2012, issued in corresponding European Patent Application No. 08000746.1 (6 pages).
Chinese Office Action dated Aug. 2, 2012, issued in corresponding Chinese Patent Application No. 201110043079.2, with English translation (13 pages).
Japanese Office Action dated Feb. 26, 2013, issued in corresponding Japanese Patent Application No. 2011-002343, with English translation (6 pages).

* cited by examiner

TRANSPARENT CONDUCTIVE FILM, METHOD FOR PRODUCTION THEREOF AND TOUCH PANEL THEREWITH

This application is a continuation of application Ser. No. 12/015,006 filed Jan. 16, 2008, which is hereby incorporated by reference herein in its entirety.

BACKGROUND OF THE INVENTION

1. Field of the Invention

The present invention relates to a transparent conductive film that has transparency in the visible light range and includes a film substrate and a transparent conductor layer provided on the substrate with an undercoat layer interposed therebetween, and also to a method for production thereof. The invention also relates to a touch panel including the transparent conductive film.

The transparent conductive film of the present invention may be used for transparent electrodes in touch panels and display systems such as liquid crystal displays and electroluminescence displays and also used for electromagnetic wave shielding or prevention of static charge of transparent products. In particular, the transparent conductive film of the present invention is preferably used for touch panels. The transparent conductive film of the invention is particularly suitable for use in capacitive coupling type touch panels.

2. Description of the Related Art

Touch panels can be classified according to the position detecting method into an optical type, an ultrasonic type, a capacitive type, a resistive film type, and so on. Resistive film type touch panels are configured to include a transparent conductive film and a transparent conductor layer-carrying glass plate that are arranged opposite to each other with a spacer interposed therebetween, in which an electric current is allowed to flow through the transparent conductive film, while the voltage at the transparent conductor-carrying glass plate is measured. On the other hand, capacitive type touch panels are basically configured to include a substrate and a transparent conductive layer provided on the substrate and characterized by having no moving part. Capacitive type touch panels have high durability and high transmittance and thus are suitable for use in vehicle applications.

For example, a transparent conductive film for the touch panels is proposed that includes a transparent film substrate, and a first undercoat layer, a second undercoat layer and a transparent conductor layer formed in this order from the film substrate side on one side of the transparent film substrate (see Patent Literature 1: Japanese Patent Application Laid-Open (JP-A) No. 2002-326301).

SUMMARY OF THE INVENTION

In the transparent conductive film, the transparent conductor layer may be patterned. When the transparent conductor layer is patterned, however, the difference between the patterned portion and the non-patterned portion can become clear so that a display device produced therewith can have a poor appearance. Particularly, the transparent conductor layer is placed on the light-incident surface side in capacitive coupling type touch panels. Therefore, it is desired to produce a display device with a good appearance, even when the transparent conductor layer is patterned.

It is an object of the present invention to provide a transparent conductive film that has a patterned transparent conductor layer and a good appearance and to provide a method for production thereof. It is another object of the invention to provide a touch panel including such a transparent conductive film.

As a result of investigations for solving the problems, the inventors of the present invention have found that the objects can be achieved using the features described below, and finally completed the invention.

Namely, the transparent conductive film of the present invention is a transparent conductive film, comprising: a transparent film substrate; a transparent conductor layer provided on one or both sides of the transparent film substrate; and at least one undercoat layer interposed between the transparent film substrate and the transparent conductor layer; wherein: the transparent conductor layer is patterned; and a non-patterned portion not having the transparent conductor layer has the at least one undercoat layer.

In the above, it is preferable that at least two undercoat layers are interposed, and at least the undercoat layer most distant from the transparent film substrate is patterned in the same manner as the transparent conductor layer.

In the above, it is preferable that at least two undercoat layers are interposed, and at least the undercoat layer most distant from the transparent film substrate is made of an inorganic material. It is preferable that the undercoat layer made of the inorganic material is a $SiO_2$ film.

In the above, it is preferable that the first undercoat layer from the transparent film substrate is made of an organic material.

In the above, it is preferable that there is a difference of 0.1 or more between the refractive indices of the transparent conductor layer and the undercoat layer.

In the above, it is preferable that two undercoat layers are interposed between the patterned transparent conductor layer and the transparent film substrate, the first undercoat layer from the transparent film substrate has a refractive index (n) of 1.5 to 1.7 and a thickness (d) of 100 nm to 220 nm, the second undercoat layer from the transparent film substrate has a refractive index (n) of 1.4 to 1.5 and a thickness (d) of 20 nm to 80 nm, the transparent conductor layer has a refractive index (n) of 1.9 to 2.1 and a thickness (d) of 15 nm to 30 nm, and the total of the optical thicknesses (n×d) of the respective layers is from 208 nm to 554 nm.

In the above, it is preferable that there is a difference ($\Delta nd$) of 40 nm to 130 nm between the total of the optical thicknesses of the patterned transparent conductor layer and the two undercoat layers and the optical thickness of the undercoat layer in the non-patterned portion.

Also, the transparent conductive film of the present invention is a transparent conductive film, comprising: at least two pieces of the above-mentioned transparent conductive film that are laminated with a transparent pressure-sensitive adhesive layer interposed therebetween such that the patterned transparent conductor layer is placed on at least one side.

Also, the transparent conductive film of the present invention is a transparent conductive film, comprising: the above-mentioned transparent conductive film, and a transparent substrate that is bonded to one side of the above-mentioned transparent conductive film with a transparent pressure-sensitive adhesive layer interposed therebetween such that the patterned transparent conductor layer is placed on one side.

In the above, it is preferable that the transparent conductive film is for use in a touch panel. It is preferable that the touch panel is a capacitive coupling type touch panel.

Also, the method for producing a transparent conductive film of the present invention is a method for producing the above-mentioned transparent conductive film, comprising the steps of: preparing a transparent conductive film comprising a transparent film substrate and a transparent conductor layer formed on one or both sides of the transparent film substrate with at least one undercoat layer interposed therebetween; and patterning the transparent conductor layer by etching with an acid.

In the above, it is preferable that at least two undercoat layers are interposed, and the method further comprises the step of etching at least the undercoat layer most distant from the transparent film substrate with an alkali after the step of patterning the transparent conductor layer by etching with an acid.

In the above, it is preferable that the method further comprises the step of crystallizing the patterned transparent conductor layer by annealing, after the step of patterning the transparent conductor layer.

Also, the touch panel of the present invention is a touch panel, comprising the above-mentioned transparent conductive film.

In conventional transparent conductive films, patterned transparent conductor layers produce a clear difference in reflectance between the patterned and non-patterned portions so that the appearance can be degraded. In the transparent conductive film of the present invention, the transparent conductor layer is patterned, but the non-patterned portion has the undercoat layer so that the difference in reflectance between the patterned and non-patterned portions can be kept small. Thus, the defect caused by patterned portions distinguishable from one another can be avoided so that a good appearance can be provided. The formation of the undercoat layer in the non-patterned portion prevents the exposure of the film substrate so that oligomer generation can be inhibited in the film substrate, which is favorable for the appearance. The undercoat layer provided in the non-patterned portion can insulate portions of the patterned transparent conductor layer from one another, and the patterned transparent conductor layer can widen the scope of application of the transparent conductive film. The transparent conductive film described above is suitable for use in touch panels and particularly suitable for use in capacitive coupling type touch panels.

DETAILED DESCRIPTION OF THE PREFERRED EMBODIMENTS

Figure 1:
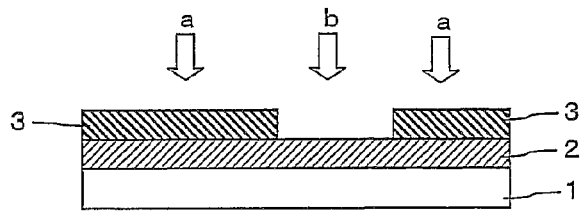
FIG. 1 is a cross-sectional view showing a transparent conductive film according to one embodiment of the present invention.
Figure 2:
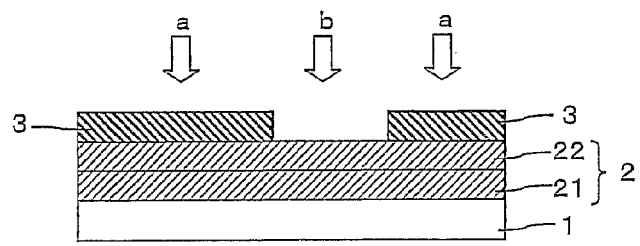
FIG. 2 is a cross-sectional view showing a transparent conductive film according to one embodiment of the present invention.
Figure 3:
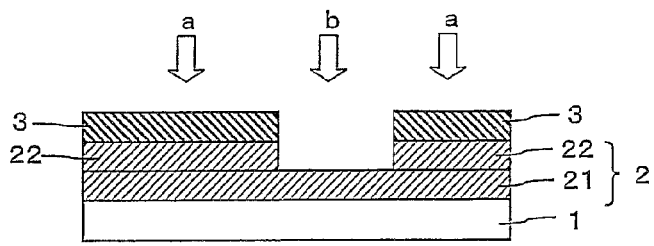
FIG. 3 is a cross-sectional view showing a transparent conductive film according to one embodiment of the present invention.
Figure 4:
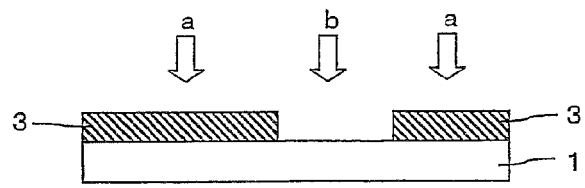
FIG. 4 is a cross-sectional view showing a transparent conductive film according to Comparative Example 1.

Embodiments of the present invention are described below with reference to the drawings. FIG. 1 is a cross-sectional view showing an example of the transparent conductive film of the invention. The transparent conductive film of FIG. 1 includes a transparent film substrate 1 and a transparent conductor layer 3 provided on one side of the substrate 1 with an undercoat layer 2 interposed therebetween. The transparent conductor layer 3 is patterned. In each drawing, patterning of the transparent conductor layer 3 is indicated by the combination of a patterned portion a having the transparent conductor layer 3 and a non-patterned portion b not having the transparent conductor layer 3. The non-patterned portion b has the undercoat layer 2. FIGS. 2 and 3 show cases where two undercoat layers (generically indicated by 2) are provided. In FIG. 2 or 3, undercoat layers 21 and 22 are formed in this order from the transparent film substrate 1 side. FIG. 2 shows a case where the non-patterned portion b has undercoat layers 21 and 22. In FIG. 3, an undercoat layer 22 most distant from the transparent film substrate 1 is also patterned in the same manner as the transparent conductor layer 3. In FIG. 3, the non-patterned portion b has an undercoat layer 21. Specifically, where the undercoat layer 2 has a two-layer structure, the non-patterned portion b has at least the first undercoat layer 21 from the transparent film substrate 1 side. While FIGS. 2 and 3 each illustrate the case where the undercoat layers 2 has a two-layer structure, the undercoat layer 2 may have a three- or more-layer structure. When the undercoat layer 2 has a three- or more-layer structure, the non-patterned portion b may have at least the first undercoat layer 21 from the transparent film substrate 1 side. An undercoat layer or layers upper than the first undercoat layer may be patterned or not patterned. It is preferred that the undercoat layer 2 should be composed of at least two layers, because in such a case, the difference in reflectance between the patterned portion a and the non-patterned portion b can be controlled to be small. Particularly when the undercoat layer 2 is composed of at least two layers, the undercoat layer most distant from the transparent film substrate (the layer 22 when the undercoat layer 2 is composed of two layers as shown in FIG. 3) is preferably patterned in the same manner as the transparent conductor layer 3, in order that the difference in reflectance between the patterned portion a and the non-patterned portion b may be controlled to be small. FIG. 4 shows a case where a patterned transparent conductor layer 3 is provided on one side of a transparent film substrate 1 without the undercoat layer 2 interposed therebetween.

Figure 5:
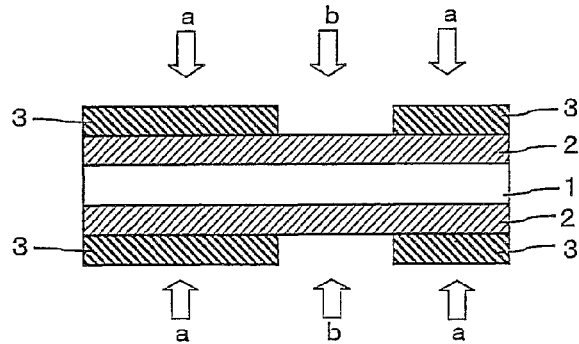
FIG. 5 is a cross-sectional view showing a transparent conductive film according to one embodiment of the present invention.

FIG. 5 is also a cross-sectional view showing a further example of the transparent conductive film of the invention. While the structure shown in FIG. 1 is used for illustration in FIG. 5, it will be understood that the structure shown in FIG. 2 or 3 may also be used as an alternative in the case of FIG. 5. The transparent conductive film of FIG. 5 includes a transparent film substrate 1 and a patterned transparent conductor layer 3 provided on both sides of the substrate 1 with an undercoat layer 2 interposed therebetween. The transparent conductive film of FIG. 5 has the patterned transparent conductor layer 3 on both sides. Alternatively, however, the transparent conductor layer 3 may be patterned only on one side. In the transparent conductive film of FIG. 5, the patterned portion a and the non-patterned portion b in the patterned transparent conductor layer 3 on one side are the same as those on the other side. Alternatively, however, these may be different between both sides, and both sides may be each appropriately patterned in various shapes. This applies to the cases of the other drawings.

Figure 6:
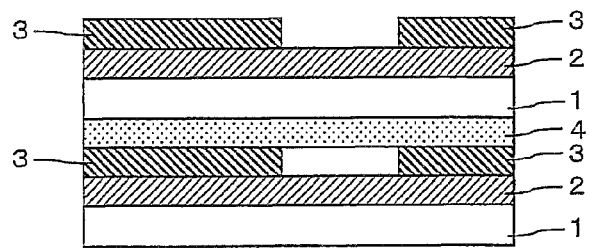
FIG. 6 is a cross-sectional view showing a transparent conductive film according to one embodiment of the present invention.
Figure 7:
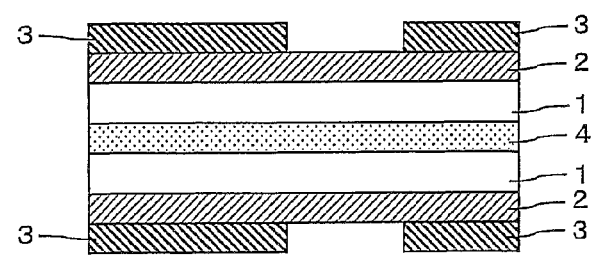
FIG. 7 is a cross-sectional view showing a transparent conductive film according to one embodiment of the present invention.
Figure 8:
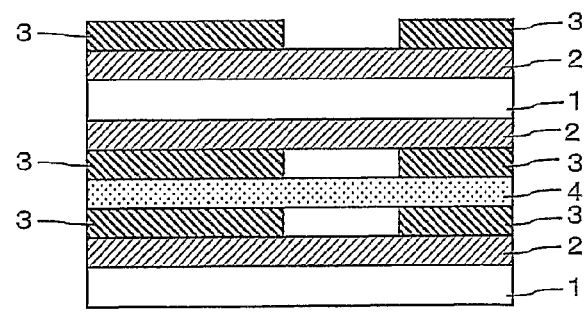
FIG. 8 is a cross-sectional view showing a transparent conductive film according to one embodiment of the present invention.
Figure 9:
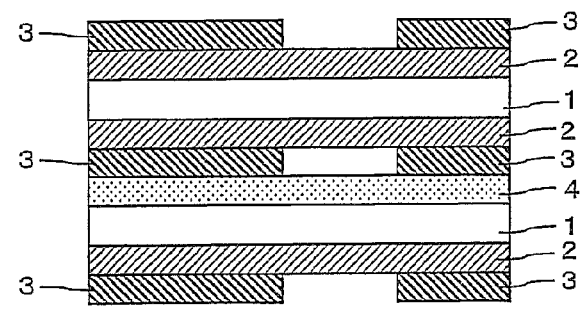
FIG. 9 is a cross-sectional view showing a transparent conductive film according to one embodiment of the present invention.

FIGS. 6 to 9 each also show a further example of the transparent conductive film of the present invention. The transparent conductive film of each of FIGS. 6 to 9 includes two pieces of the transparent conductive film shown in FIG. 1 or 5 laminated with a transparent pressure-sensitive adhesive layer 4 interposed therebetween. In each of FIGS. 6 to 9, the transparent conductive films obtained by being laminated are laminated such that the patterned transparent conductor layer 3 is placed on at least one side. In FIGS. 6 and 7, two pieces of the transparent conductive film shown in FIG. 1 are laminated with the transparent pressure-sensitive adhesive layer 4 interposed therebetween. FIG. 6 shows a case where the transparent film substrate 1 of a piece of the transparent conductive film shown in FIG. 1 is laminated on the patterned transparent conductor layer 3 of another piece of the transparent conductive film shown in FIG. 1 with the transparent pressure-sensitive adhesive layer 4 interposed therebetween. FIG. 7 shows a case where the transparent film substrates 1 of two pieces of the transparent conductive film shown in FIG. 1 are laminated on each other with the transparent pressure-sensitive adhesive layer 4 interposed therebetween. In FIGS. 8 and 9, the transparent conductive film shown in FIG. 1 is laminated on the transparent conductive film shown in FIG. 5 with the transparent pressure-sensitive adhesive layer 4 interposed therebetween. FIG. 8 shows a case where the patterned transparent conductor layer 3 of the transparent conductive film shown in FIG. 1 is laminated on one of the patterned transparent conductor layers 3 of the transparent conductive film shown in FIG. 5 with the transparent pressure-sensitive adhesive layer 4 interposed therebetween. FIG. 9 shows a case where the transparent film substrate 1 of the transparent conductive film shown in FIG. 1 is laminated on one of the patterned transparent conductor layers 3 of the transparent conductive film shown in FIG. 5 with the transparent pressure-sensitive adhesive layer 4 interposed therebetween. FIGS. 6 to 9 illustrate the case where the transparent conductive film shown in FIG. 1 or 5 is used for the lamination of two pieces with the transparent pressure-sensitive adhesive layer interposed therebetween. Alternatively, however, three or more pieces may be appropriately combined using the transparent conductive film shown in FIG. 1 or 5 according to the embodiment of each of FIGS. 6 to 9. While the structure of FIG. 1 is used in the case of each of FIGS. 6 to 9 for illustration, it will be understood that the structure of FIG. 2 or 3 may be used instead in the case of each of FIGS. 6 to 9.

Figure 10:
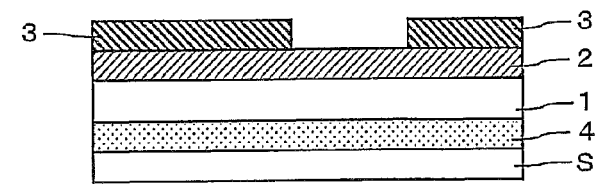
FIG. 10 is a cross-sectional view showing a transparent conductive film according to one embodiment of the present invention.
Figure 11:
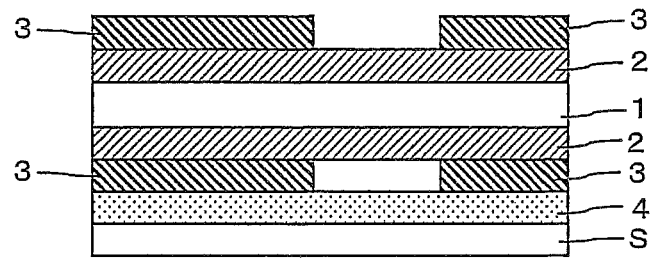
FIG. 11 is a cross-sectional view showing a transparent conductive film according to one embodiment of the present invention.

The transparent conductive film of the present invention may be provided with the pressure-sensitive adhesive layer 4 when used. The pressure-sensitive adhesive layer 4 may be laminated on one side of the transparent conductive film in a similar manner to the placement of the patterned transparent conductor layer 3. FIG. 10 shows a case where the transparent pressure-sensitive adhesive layer 4 is laminated on the transparent film substrate 1 of the transparent conductive film shown in FIG. 1. FIG. 11 shows a case where the transparent pressure-sensitive adhesive layer 4 is laminated on one of the patterned transparent conductor layers 3 of the transparent conductive film shown in FIG. 5. In FIG. 10 or 11, a separator S is provided on the pressure-sensitive adhesive layer 4. Even when two or more transparent conductive films are laminated as shown in FIGS. 6 to 9, the pressure-sensitive adhesive layer 4 may also be laminated on one side of the transparent conductive film in a similar manner to the placement of the patterned transparent conductor layer 3.

Figure 12:
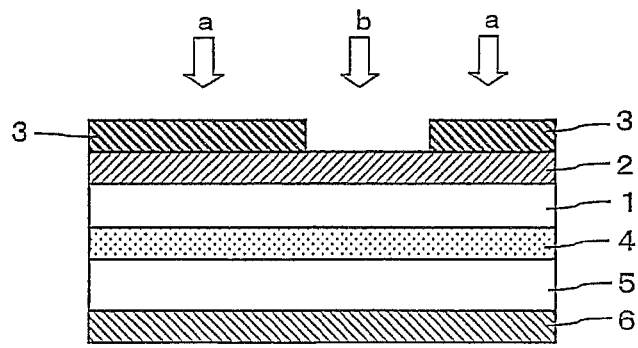
FIG. 12 is a cross-sectional view showing a transparent conductive film according to one embodiment of the present invention.

A transparent substrate 5 may be further bonded to one side of the transparent conductive film with a transparent pressure-sensitive adhesive layer 4 interposed therebetween. The transparent substrate 5 may be bonded to the transparent conductive film in a similar manner to the placement of the patterned transparent conductor layer 3 on one side. FIG. 12 shows another transparent conductive film that is configured to include the transparent conductive film of FIG. 1 and a transparent substrate 5 that is bonded to the transparent film substrate 1 of the transparent conductive film of FIG. 1 (on the side where the transparent conductor layer 3 is not provided) with a transparent pressure-sensitive adhesive layer 4 interposed therebetween. The transparent substrate 5 may comprise a single base film or a laminate of two or more base films (which may be laminated with a transparent pressure-sensitive adhesive layer interposed therebetween). FIG. 12 also shows a case where a hard coat layer (resin layer) 6 is provided on the outer surface of the transparent substrate 5. The transparent conductive film of FIG. 1 is used for illustration in FIG. 12. Alternatively, however, the transparent conductive film of FIG. 2 or 3 may be used in the same structure. The transparent conductive film configured as shown in each of FIGS. 5 to 9 may also be used in the same structure.

There is no particular limitation to the film substrate 1, and various types of plastic films having transparency may be used. Examples of the material for the film substrate 1 include polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resins. In particular, polyester resins, polycarbonate resins, and polyolefin resins are preferred.

Examples thereof also include polymer films as disclosed in JP-A No. 2001-343529 (WO01/37007) and a resin composition that contains (A) a thermoplastic resin having a side chain of a substituted and/or unsubstituted imide group and (B) a thermoplastic resin having a side chain of substituted and/or unsubstituted phenyl and nitrile groups. Specifically, a polymer film of a resin composition containing an alternating copolymer made of isobutylene and N-methylmaleimide, and an acrylonitrile-styrene copolymer may be used.

The thickness of the film substrate 1 is preferably in the range of 2 to 200 μm, more preferably in the range of 2 to 100 μm. If the thickness of the film substrate 1 is less than 2 μm, the film substrate 1 can have insufficient mechanical strength so that it can be difficult to use the film substrate 1 in the form of a roll in the process of continuously forming the undercoat layer 2 and the transparent conductor layer 3 in some cases. If the thickness exceeds 200 μm, it can be impossible to improve the scratch resistance of the transparent conductor layer 3 or the tap properties thereof for touch panels in some cases.

The surface of the film substrate 1 may be previously subject to sputtering, corona discharge treatment, flame treatment, ultraviolet irradiation, electron beam irradiation, chemical treatment, etching treatment such as oxidation, or undercoating treatment such that the adhesion of the undercoat layer 2 formed thereon to the film substrate 1 can be improved. If necessary, the film substrate may also be subjected to dust removing or cleaning by solvent cleaning, ultrasonic cleaning or the like, before the undercoat layer 2 is formed.

According to the invention, having the undercoat layer 2 makes it possible to obtain a good appearance display device, even when the transparent conductor layer 3 is patterned. From this point of view, the undercoat layer 2 preferably has a refractive index that is 0.1 or more different from the refractive index of the transparent conductor layer 3. The difference between the refractive indices of the transparent conductor layer 3 and the undercoat layer is preferably from 0.1 to 0.9, more preferably from 0.1 to 0.6. The undercoat layer 2 generally has a refractive index of 1.3 to 2.5, preferably of 1.38 to 2.3, more preferably of 1.4 to 2.3.

The undercoat layer 2 may be made of an inorganic material, an organic material or a mixture of inorganic and organic materials. Examples of the inorganic material include NaF (1.3), $Na_3AlF_6$ (1.35), LiF (1.36), $MgF_2$ (1.38), $CaF_2$ (1.4), $BaF_2$ (1.3), $SiO_2$ (1.46), $LaF_3$ (1.55), $CeF_3$ (1.63), and $Al_2O_3$ (1.63), wherein each number inside the parentheses indicates the light refractive index of each material. In particular, $SiO_2$, $MgF_2$, $Al_2O_3$ or the like is preferably used, and $SiO_2$ is particularly preferred. Besides the above, a complex oxide may also be used that comprises about 10 to about 40 parts by weight of cerium oxide and 0 to about 20 parts by weight of tin oxide based on indium oxide.

Examples of the organic material include acrylic resins, urethane resins, melamine resins, alkyd resins, siloxane polymers, and organosilane condensates. At least one selected from the above organic materials may be used. In particular, a thermosetting resin comprising a mixture of a melamine resin, an alkyd resin and an organosilane condensate is preferably used as the organic material.

The undercoat layer 2 is placed between the transparent film substrate 1 and the transparent conductor layer 3. The undercoat layer 2 does not function as an electrical conductor layer. Specifically, the undercoat layer 2 is formed as a dielectric layer such that it can provide insulation between portions of the patterned transparent conductor layer 3. Therefore, the undercoat layer 2 generally has a surface resistance of $1\times10^6$ Ω/square or more, preferably of $1\times10^7$ Ω/square or more, more preferably of $1\times10^8$ Ω/square or more. The surface resistance of the undercoat layer 2 has no specific upper limit. In general, measuring limit, about $1\times10^{13}$ Ω/square may be an upper limit for the surface resistance of the undercoat layer 2, but it may be higher than $1\times10^{13}$ Ω/square.

The first undercoat layer from the transparent film substrate 1 is preferably made of an organic material in terms of forming the patterned transparent conductor layer 3 by etching. Therefore, the undercoat layer 2 composed of a single layer is preferably made of an organic material.

When the undercoat layer 2 is composed of at least two layers, at least a layer that forms the undercoat layer 2 and is most distant from the transparent film substrate 1 is preferably made of an inorganic material in terms of forming the patterned transparent conductor layer 3 by etching. When the undercoat layer 2 is composed of three or more layers, a layer or layers that are above the second layer from the transparent film substrate 1 are also preferably made of an inorganic material.

The undercoat layer made of an inorganic material may be formed by a dry process such as vacuum deposition, sputtering, and ion plating or a wet process (coating). The inorganic material for forming the undercoat layer is preferably $SiO_2$ as described above. In a wet process, a silica sol or the like may be applied to form a $SiO_2$ film.

Under the foregoing, when two layers of the undercoat layers 2 are formed, it is preferred that the first undercoat layer 21 should be made of an organic material and that the second undercoat layer 22 should be made of an inorganic material.

The thickness of the undercoat layer 2 is generally, but not limited to, from about 1 to about 300 nm, preferably from 5 to 300 nm, in view of optical design and the effect of preventing oligomer production from the film substrate 1. When two or more undercoat layers 2 are formed, the thickness of each layer may be from about 5 to about 250 nm, preferably from 10 to 250 nm.

As described above, the transparent conductor layer 3 preferably has a refractive index that is 0.1 or more different from the refractive index of the undercoat layer 2. The transparent conductor layer 3 generally has a refractive index of about 1.95 to about 2.05.

Examples of materials that may be used to form the transparent conductor layer 3 include, but are not limited to, oxides of at least one metal selected from the group consisting of indium, tin, zinc, gallium, antimony, titanium, silicon, zirconium, magnesium, aluminum, gold, silver, copper, palladium, and tungsten. Such metal oxides may be optionally doped with any metal atom selected from the above group. For example, indium oxide doped with tin oxide or tin oxide doped with antimony is preferably used.

The thickness of the transparent conductor layer 3 is preferably, but not limited to, 10 nm or more, in terms of making it in the form of a continuous coating with good electrical conductivity and a surface resistance of $1\times10^3$ Ω/square or less. If it is too thick, its transparency can be reduced. Thus, it preferably has a thickness of 15 to 35 nm, more preferably within the range of 20 to 30 nm. If it has a thickness of less than 15 nm, its surface electric resistance can be high, and it can be difficult to make it in the form of a continuous film. If it has a thickness of more than 35 nm, its transparency can be reduced.

A production method of the transparent conductor layer 3 is not particularly limited, and may be formed using any known conventional method. Examples thereof include vacuum deposition, sputtering, and ion plating. Any appropriate method may be used depending on the desired thickness. After the transparent conductor layer 3 is formed, it may be optionally crystallized by annealing at a temperature in the range of 100 to 150° C. For this purpose, the film substrate 1 preferably has heat resistance to 100° C. or higher, more preferably to 150° C. or higher. According to the present invention, the transparent conductor layer 3 is patterned by etching. After the transparent conductor layer 3 is crystallized, it can be difficult to etch it. Therefore, it is preferred that the annealing of the transparent conductor layer 3 should be performed after the transparent conductor layer 3 is patterned. In a case where the undercoat layer 2 is also subjected to etching, the annealing of the transparent conductor layer 3 is preferably performed after the etching of the undercoat layer 2.

Figure 13:
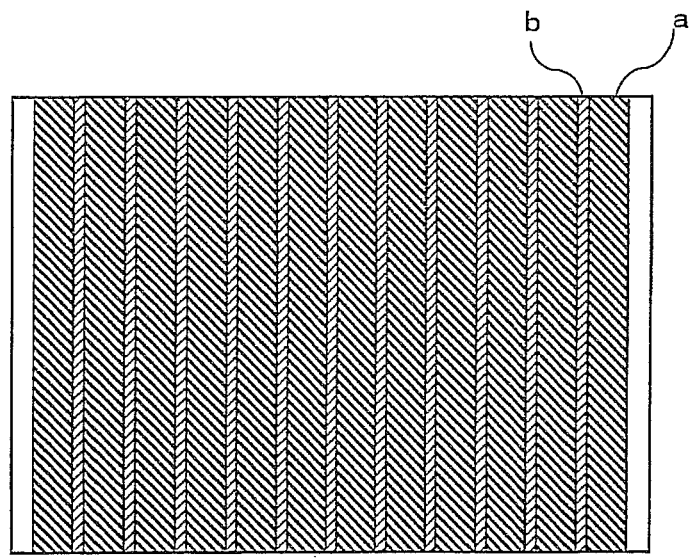
FIG. 13 is a top view showing an example of the pattern of the transparent conductive film of the present invention.

The transparent conductor layer 3 is patterned on the undercoat layer 2. Any of various patterns may be formed depending on applications for which the transparent conductive film can be used. When the transparent conductor layer 3 is patterned, a patterned portion and a non-patterned portion are formed. For example, the patterned portion may have a stripe shape or any other shape. FIG. 13 is a top view of an example of the transparent conductive film of the present invention having the transparent conductor layer 3 in a stripe shape. In this transparent conductive film, a patterned portion a and a non-patterned portion b of the transparent conductor layer 3 are formed in stripe shapes. In FIG. 13, the width of the patterned portion a is larger than that of the non-patterned portion b, but this feature is optional.

The transparent conductive film of the invention may be produced by any method without particular limitation, as long as an undercoat layer and a transparent conductor layer each having the above-described structure can be formed on one or both sides of a transparent film substrate. According to a conventional technique, for example, a transparent conductive film including a transparent film substrate and a transparent conductor layer provided on one or both sides of the film substrate with an undercoat layer interposed between the film substrate and the conductor layer may be prepared, and then the transparent conductor layer may be patterned by etching, so that the transparent conductive film of the present invention can be produced. In the etching process, the transparent conductor layer may be covered with a patterning mask and then etched with an etching solution.

Indium oxide doped with tin oxide or antimony-doped tin oxide is preferably used to form the transparent conductor layer. Therefore, an acid is preferably used for the etching solution. Examples of the acid include inorganic acids such as hydrogen chloride, hydrogen bromide, sulfuric acid, nitric acid, and phosphoric acid; organic acids such as acetic acid; and any mixture thereof and any aqueous solution thereof.

When at least two undercoat layers are provided, only the transparent conductor layer may be patterned by etching, or otherwise patterning of the transparent conductor layer by etching with an acid may be followed by patterning of at least the undercoat layer most distant from the transparent film substrate by etching in the same manner as in the case of the transparent conductor layer. Preferably, the undercoat layer or layers other than the first undercoat layer from the transparent film substrate may be patterned by etching in the same manner as in the case of the transparent conductor layer.

In the process of etching the undercoat layer, the undercoat layer may be covered with a mask for forming patterns in the same manner as in the case of etching the transparent conductor layer and then etched with an etching solution. As described above, an inorganic material such as $SiO_2$ is preferably used to form the second undercoat layer or the undercoat layer(s) above the second undercoat layer. Therefore, an alkali is preferably used for the etching solution. Examples of the alkali include aqueous solutions of sodium hydroxide, potassium hydroxide, ammonia, and tetramethylammonium hydroxide; and any mixture thereof. The first undercoat layer is preferably made of an organic material that cannot be etched with acids or alkalis.

When the patterned transparent conductor layer is provided through two undercoat layers to form the transparent conductive film of the present invention, the refractive index (n) and thickness (d) of each layer and the total of the optical thicknesses (n×d) of the respective layers are preferably as described below in the patterned portion, so that the patterned portion and the non-patterned portion can be designed such that the difference in reflectance between them can be small.

The first undercoat layer from the transparent film substrate preferably has a refractive index (n) of 1.5 to 1.7, more preferably of 1.5 to 1.65, sill more preferably of 1.5 to 1.6, and preferably has a thickness (d) of 100 to 220 nm, more preferably of 120 to 215 nm, still more preferably of 130 to 210 nm.

The second undercoat layer from the transparent film substrate preferably has a refractive index (n) of 1.4 to 1.5, more preferably of 1.41 to 1.49, sill more preferably of 1.42 to 1.48, and preferably has a thickness (d) of 20 to 80 nm, more preferably of 20 to 70 nm, still more preferably of 20 to 60 nm.

The transparent conductor layer preferably has a refractive index (n) of 1.9 to 2.1, more preferably of 1.9 to 2.05, sill more preferably of 1.9 to 2.0, and preferably has a thickness (d) of 15 to 30 nm, more preferably of 15 to 28 nm, still more preferably of 15 to 25 nm.

The total of the optical thicknesses (n×d) of the respective layers (the first and second undercoat layers and the transparent conductor layer) is preferably from 208 to 554 nm, more preferably from 230 to 500 nm, still more preferably from 250 to 450 nm.

The difference (Δnd) between the total of the optical thicknesses in the patterned portion and the optical thickness of the undercoat layer in the non-patterned portion is preferably from 40 to 130 nm. The difference (Δnd) between the optical thicknesses is more preferably from 40 to 120 nm, still more preferably from 40 to 110 nm.

As described above, at least two pieces of the transparent conductive film of the present invention may be laminated with a transparent pressure-sensitive adhesive layer 4 interposed therebetween such that the patterned transparent conductor layer 3 is placed on at least one side. A transparent pressure-sensitive adhesive layer 4 may also be laminated on the transparent conductive film of the invention such that the patterned transparent conductor layer 3 is placed on one side.

In a similar manner to the placement of the patterned transparent conductor layer 3, a transparent substrate 5 may be bonded to one side of the transparent conductive film of the invention with a transparent pressure-sensitive adhesive layer 4 interposed therebetween. The transparent substrate 5 may be a composite structure including at least two transparent base films bonded to one another with a transparent pressure-sensitive adhesive layer interposed therebetween. It is also possible to form the patterned transparent conductor layer 3 in the transparent conductive film with such a structure.

In general, the thickness of the transparent substrate 5 is preferably from 90 to 300 μm and more preferably controlled to be from 100 to 250 μm. When the transparent substrate 5 is composed of a plurality of base films, the thickness of each base film is preferably from 10 to 200 μm, more preferably from 20 to 150 μm, and may be controlled such that the total thickness of the transparent substrate 5 including these base films and a transparent pressure-sensitive adhesive layer(s) can fall within the above range. Examples of the base film may include those described above for the film substrate 1.

The transparent conductive film (e.g., the film substrate 1) and the transparent substrate 5 may be bonded by a process including the steps of forming the pressure-sensitive adhesive layer 4 on the transparent substrate 5 side and bonding the film substrate 1 thereto or by a process including the steps of forming the pressure-sensitive adhesive layer 4 contrarily on the film substrate 1 side and bonding the transparent substrate 5 thereto. The latter process is more advantageous in view of productivity, because it enables continuous production of the pressure-sensitive adhesive layer 4 with the film substrate 1 in the form of a roll. Alternatively, the transparent substrate 5 may be formed on the film substrate 1 by sequentially laminating a plurality of base films with the pressure-sensitive adhesive layers. The transparent pressure-sensitive adhesive layer for use in laminating the base films may be made of the same material as the transparent pressure-sensitive adhesive layer 4 described below. The transparent conductive films may also be laminated and bonded to one another with a pressure-sensitive adhesive layer(s) 4, after the surfaces to be bonded are appropriately selected.

Any transparent pressure-sensitive adhesive may be used for the pressure-sensitive adhesive layer 4 without limitation. For example, the pressure-sensitive adhesive may be appropriately selected from adhesives based on polymers such as acrylic polymers, silicone polymers, polyester, polyurethane, polyamide, polyvinyl ether, vinyl acetate-vinyl chloride copolymers, modified polyolefins, epoxy polymers, fluoropolymers, and rubbers such as natural rubbers and synthetic rubbers. In particular, acrylic pressure-sensitive adhesives are preferably used, because they have good optical transparency and good weather or heat resistance and exhibit suitable wettability and adhesion properties such as cohesiveness and adhesiveness.

The anchoring strength can be improved using an appropriate pressure-sensitive adhesive primer, depending on the type of the pressure-sensitive adhesive as a material for forming the pressure-sensitive adhesive layer 4. In the case of using such a pressure-sensitive adhesive, therefore, a certain pressure-sensitive adhesive primer is preferably used.

The pressure-sensitive adhesive primer may be of any type as long as it can improve the anchoring strength of the pressure-sensitive adhesive. For example, the pressure-sensitive adhesive primer that may be used is a so-called coupling agent such as a silane coupling agent having a hydrolyzable alkoxysilyl group and a reactive functional group such as amino, vinyl, epoxy, mercapto, and chloro in the same molecule; a titanate coupling agent having an organic functional group and a titanium-containing hydrolyzable hydrophilic group in the same molecule; and an aluminate coupling agent having an organic functional group and an aluminum-containing hydrolyzable hydrophilic group in the same molecule; or a resin having an organic reactive group, such as an epoxy resin, an isocyanate resin, a urethane resin, and an ester urethane resin. In particular, a silane coupling agent-containing layer is preferred, because it is easy to handle industrially.

The pressure-sensitive adhesive layer 4 may contain a crosslinking agent depending on the base polymer. If necessary, the pressure-sensitive adhesive layer 4 may also contain appropriate additives such as natural or synthetic resins, glass fibers or beads, or fillers comprising metal powder or any other inorganic powder, pigments, colorants, and antioxidants. The pressure-sensitive adhesive layer 4 may also contain transparent fine particles so as to have light diffusing ability.

The transparent fine particles to be used may be one or more types of appropriate conductive inorganic fine particles of silica, calcium oxide, alumina, titania, zirconia, tin oxide, indium oxide, cadmium oxide, antimony oxide, or the like with an average particle size of 0.5 to 20 µm or one or more types of appropriate crosslinked or uncrosslinked organic fine particles of an appropriate polymer such as poly(methyl methacrylate) and polyurethane with an average particle size of 0.5 to 20 µm.

The pressure-sensitive adhesive layer 4 is generally formed using a pressure-sensitive adhesive solution with a solids content of about 10 to 50% by weight, in which a base polymer or a composition thereof is dissolved or dispersed in a solvent. An organic solvent such as toluene and ethyl acetate, water, or any other solvent may be appropriately selected depending on the type of the pressure-sensitive adhesive and used as the above solvent.

After the bonding of the transparent substrate 5, the pressure-sensitive adhesive layer 4 has a cushion effect and thus can function to improve the scratch resistance of the transparent conductor layer formed on one side of the film substrate 1 or to improve the tap properties thereof for touch panels, such as so called pen input durability and surface pressure durability. In terms of performing this function better, it is preferred that the elastic modulus of the pressure-sensitive adhesive layer 4 is set in the range of 1 to 100 N/cm$^2$ and that its thickness is set at 1 µm or more, generally in the range of 5 to 100 µm. If the thickness is as described above, the effect can be sufficiently produced, and the adhesion between the transparent substrate 5 and the film substrate 1 can also be sufficient. If the thickness is lower than the above range, the durability or adhesion cannot be sufficiently ensured. If the thickness is higher than the above range, outward appearances such as transparency can be degraded. In other modes, the elastic modulus and thickness of the pressure-sensitive adhesive layer 4 applied to the transparent conductive film should also be the same as described above.

If the elastic modulus is less than 1 N/cm$^2$, the pressure-sensitive adhesive layer 4 can be inelastic so that the pressure-sensitive adhesive layer can easily deform by pressing to make the film substrate 1 irregular and further to make the transparent conductor layer 3 irregular. If the elastic modulus is less than 1 N/cm$^2$, the pressure-sensitive adhesive can be easily squeezed out of the cut section, and the effect of improving the scratch resistance of the transparent conductor layer 3 or improving the tap properties of the transparent conductor layer 3 for touch panels can be reduced. If the elastic modulus is more than 100 N/cm$^2$, the pressure-sensitive adhesive layer 4 can be hard, and the cushion effect cannot be expected, so that the scratch resistance of the transparent conductor layer 3 or the pen input durability and surface pressure durability of the transparent conductor layer 3 for touch panels tends to be difficult to be improved.

If the thickness of the pressure-sensitive adhesive layer 4 is less than 1 µm, the cushion effect also cannot be expected so that the scratch resistance of the transparent conductor layer 3 or the pen input durability and surface pressure durability of the transparent conductor layer 3 for touch panels tends to be difficult to be improved. If it is too thick, it can reduce the transparency, or it can be difficult to obtain good results on the formation of the pressure-sensitive adhesive layer 4, the bonding workability of the transparent substrate 5, and the cost.

The transparent substrate 5 bonded through the pressure-sensitive adhesive layer 4 as described above imparts good mechanical strength to the film substrate 1 and contributes to not only the pen input durability and the surface pressure durability but also the prevention of curling.

The pressure-sensitive adhesive layer 4 may be transferred using a separator S. In such a case, for example, the separator S to be used may be a laminate of a polyester film of a migration-preventing layer and/or a release layer, which is provided on a polyester film side to be bonded to the pressure-sensitive adhesive layer 4.

The total thickness of the separator S is preferably 30 µm or more, more preferably in the range of 60 to 100 µm. This is to prevent deformation of the pressure-sensitive adhesive layer 4 (dents) in a case where the pressure-sensitive adhesive layer 4 is formed and then stored in the form of a roll, in which the deformation (dents) can be expected to be caused by foreign particles or the like intruding between portions of the rolled layer.

The migration-preventing layer may be made of an appropriate material for preventing migration of migrant components in the polyester film, particularly for preventing migration of low molecular weight oligomer components in the polyester. An inorganic or organic material or a composite of inorganic and organic materials may be used as a material for forming the migration-preventing layer. The thickness of the migration-preventing layer may be set in the range of 0.01 to 20 µm as needed. The migration-preventing layer may be formed by any method such as coating, spraying, spin coating, and in-line coating. Vacuum deposition, sputtering, ion plating, spray thermal decomposition, chemical plating, electroplating, or the like may also be used.

The release layer may be made of an appropriate release agent such as a silicone release agent, a long-chain alkyl release agent, a fluorochemical release agent, and a molybdenum sulfide release agent. The thickness of the release layer may be set as appropriate in view of the release effect. In general, the thickness is preferably 20 µm or less, more preferably in the range of 0.01 to 10 µm, particularly preferably in the range of 0.1 to 5 µm, in view of handleability such as flexibility. A production method of the release layer is not particularly limited, and may be formed in the same manner as in the case of the migration-preventing layer.

An ionizing radiation-curable resin such as an acrylic resin, a urethane resin, a melamine resin, and an epoxy resin or a mixture of the above resin and aluminum oxide, silicon dioxide, mica, or the like may be used in the coating, spraying, spin coating, or in-line coating method. When the vacuum deposition, sputtering, ion plating, spray thermal decomposition, chemical plating, or electroplating method is used, a metal such as gold, silver, platinum, palladium, copper, aluminum, nickel, chromium, titanium, iron, cobalt, or tin or an oxide of an alloy thereof or any other metal compounds such as metal iodides may be used.

If necessary, an antiglare or antireflection layer for improving visibility or a hard coat layer (resin layer) 6 for protecting the outer surface may be formed on the outer surface of the transparent substrate 5 (on the side opposite to the pressure-sensitive adhesive layer 4). For example, the hard coat layer 6 is preferably made of a cured coating film of a curable resin such as a melamine resin, a urethane resin, an alkyd resin, an acrylic resin, and a silicone resin. The hard coat layer 6 preferably has a thickness of 0.1 to 30 µm. If its thickness is less than 0.1 µm, its hardness can be inadequate. If its thickness exceeds 30 µm, the hard coat layer 6 can be cracked, or curling can occur in the whole of the transparent substrate 5.

The transparent conductive film of the present invention may be provided with an antiglare layer or an antireflection layer for the purpose of increasing visibility. When the transparent conductive film is used for a resistive film type touch panel, an antiglare layer or an antireflection layer may be formed on the outer surface of the transparent substrate 5 (on the side opposite to the pressure-sensitive adhesive layer 4) similarly to the hard coat layer 6. An antiglare layer or an antireflection layer may also be formed on the hard coat layer 6. On the other hand, when the transparent conductive film is used for a capacitive type touch panel, an antiglare layer or an antireflection layer may be formed on the transparent conductor layer 3.

For example, the material to be used to form the antiglare layer may be, but not limited to, an ionizing radiation-curable resin, a thermosetting resin, a thermoplastic resin, or the like. The thickness of the antiglare layer is preferably from 0.1 to 30 µm.

The antireflection layer may use titanium oxide, zirconium oxide, silicon oxide, magnesium fluoride, or the like. In order to produce a more significant antireflection function, a laminate of a titanium oxide layer(s) and a silicon oxide layer(s) is preferably used. Such a laminate is preferably a two-layer laminate comprising a high-refractive-index titanium oxide layer (refractive index: about 1.8), which is formed on the hard coat layer 6, and a low-refractive-index silicon oxide layer (refractive index: about 1.45), which is formed on the titanium oxide layer. Also preferred is a four-layer laminate which comprises the two-layer laminate and a titanium oxide layer and a silicon oxide layer formed in this order on the two-layer laminate. The antireflection layer of such a two- or four-layer laminate can evenly reduce reflection over the visible light wavelength range (380 to 780 nm).

For example, the transparent conductive film of the present invention is suitable for use in optical type, ultrasonic type, capacitive type, or resistive film type touch panels. In particular, the transparent conductive film of the invention is suitable for use in capacitive type touch panels. Also, the transparent conductive film of the present invention can be preferably used for flexible display devices of an electrophoretic type, a twist ball type, a thermal rewritable type, an optical recording liquid crystal type, a polymer-dispersed liquid crystal type, a guest-host liquid crystal type, a toner display type, a chromism type, an electrodeposition type, and the like.

EXAMPLES

The invention is more specifically described with some examples below. It will be understood that the invention is not limited to the examples below without departing from the gist of the invention. In each example, the term "part or parts" means part or parts by weight, unless otherwise stated. And in each example, the term "%" means % by weight, unless otherwise stated.
(Refractive Index)

The refractive index of each layer was measured with a measuring beam incident on the measurement surface of each object in an Abbe refractometer manufactured by Atago Co., Ltd., according the measurement method specified for the refractometer.
(Thickness of Each Layer)

The thickness of the layer with a thickness of at least 1 µm, such as the film substrate, the transparent substrate, the hard coat layer, and the pressure-sensitive adhesive layer, was measured with a microgauge type thickness gauge manufactured by Mitutoyo Corporation. The thickness of the layer whose thickness was difficult to directly measure, such as the hard coat layer and the pressure-sensitive adhesive layer, was calculated by subtracting the thickness of the substrate from the measured total thickness of the substrate and each layer formed thereon.

The thickness of the first undercoat layer, the second undercoat layer or the ITO film was calculated using an instantaneous multichannel photodetector system MCPD-2000 (trade name) manufactured by Otsuka Electronics Co., Ltd., based on the waveform data of the resulting interference spectrum.
(Surface Resistance of Undercoat Layer)

According to JIS K 6911 (1995), the electric surface resistance (Ω/square) of the undercoat layer was measured by a double ring method using a surface high resistance meter manufactured by Mitsubishi Chemical Co., Ltd.

Example 1

Formation of Undercoat Layer

A 185 nm-thick first undercoat layer was formed from a thermosetting resin (light refractive index n of 1.54) on one side of a film substrate composed of a 25 µm-thick polyethylene terephthalate film (hereinafter referred to as "PET film"). The thermosetting resin was composed of a melamine resin, an alkyd resin and an organosilane condensate (2:2:1 in weight ratio). A silica sol (Colcoat P manufactured by Colcoat Co., Ltd.) was then diluted with ethanol to a solids content concentration of 2%. The diluted silica sol was applied to the first undercoat layer by a silica coating method and then dried and cured at 150° C. for 2 minutes to form a 33 nm-thick second undercoat layer (a $SiO_2$ film with a light refractive index of 1.46). Both of the first and second undercoat layers formed had a surface resistance of $1 \times 10^{12}$ Ω/square or more.

(Formation of Transparent Conductor Layer)

A 22 nm-thick ITO film (with a light refractive index of 2.00) of an indium-tin complex oxide was formed on the second undercoat layer by a reactive sputtering method using a sintered material composed of 97% indium oxide and 3% tin oxide in a 0.4 Pa atmosphere composed of 98% by volume of argon gas and 2% by volume of oxygen gas. And so a transparent conductive film was obtained.

(Formation of Hard Coat Layer)

A toluene solution as a material for forming a hard coat layer was prepared by adding 5 parts of a photopolymerization initiator of hydroxycyclohexyl phenyl ketone (Irgacure 184, manufactured by Ciba Specialty Chemicals Inc.) to 100 parts of an acrylic urethane resin (Unidic 17-806, manufactured by Dainippon Ink and Chemicals, Incorporated) and diluting the mixture with toluene to a concentration of 30%.

The hard coat layer-forming material was applied to one side of a transparent substrate of a 125 μm-thick PET film and dried at 100° C. for 3 minutes. The coating was then immediately irradiated with ultraviolet light from two ozone-type high-pressure mercury lamps (each 80 W/cm² in energy density, 15 cm focused radiation) to form a 5 μm-thick hard coat layer.

(Preparation of Transparent Laminated Conductive Film)

Subsequently, an about 20 μm-thick transparent acrylic pressure-sensitive adhesive layer with an elastic modulus of 10 N/cm² was formed on the other side of the transparent substrate opposite to the hard coat layer-receiving side. The pressure-sensitive adhesive layer was formed using a composition prepared by adding one part of an isocyanate crosslinking agent to 100 parts of an acrylic copolymer of butyl acrylate, acrylic acid and vinyl acetate (100:2:5 in weight ratio). The transparent conductive film (on the side where the transparent conductor layer is not provided) was bonded to the pressure-sensitive adhesive layer side so that a transparent laminated conductive film was obtained.

(Patterning of ITO Film by Etching)

A photoresist having a stripe pattern was applied to the transparent conductor layer of the transparent laminated conductive film and then dried and cured. Thereafter, the ITO film was etched by immersing it in a 5% hydrochloric acid (aqueous hydrogen chloride solution) at 25° C. for 1 minute.

(Patterning of Second Undercoat Layer by Etching)

After the ITO film was etched, the second undercoat layer was etched by immersing it in an aqueous 2% sodium hydroxide solution at 45° C. for 3 minutes, while the photoresist remained laminated. Thereafter, the photoresist was removed.

(Crystallization of Transparent Conductor Layer)

After the second undercoat layer was etched, the ITO film was crystallized by heating it at 140° C. for 90 minutes.

Example 2

A transparent laminated conductive film with a patterned ITO film was prepared using the process of Example 1, except that the patterning of the second undercoat layer by etching was not performed.

Example 3

A transparent laminated conductive film with a patterned ITO film was prepared using the process of Example 1, except that the thickness of the first undercoat layer was changed to 35 nm and that the second undercoat layer was not formed.

Example 4

A transparent laminated conductive film with a patterned ITO film was prepared using the process of Example 1, except that the thickness of the first undercoat layer was changed to 150 nm.

Example 5

A transparent laminated conductive film with a patterned ITO film was prepared using the process of Example 1, except that the thickness of the first undercoat layer was changed to 150 nm and that the patterning of the second undercoat layer by etching was not performed.

In each of Examples 2 to 5, both of the first and second undercoat layers formed had a surface resistance of $1 \times 10^{12}$ Ω/square or more.

Comparative Example 1

A transparent laminated conductive film with a patterned ITO film was prepared using the process of Example 1, except that neither the first nor second undercoat layer was formed.

Comparative Example 2

A transparent laminated conductive film with a patterned ITO film (transparent surface conductor layer) was prepared using the process of Example 1, except that a 33 nm-thick ITO film was formed in place of the first undercoat layer, the thickness of the second undercoat layer was changed to 60 nm, and the patterning of the second undercoat layer by etching was not performed. The first undercoat layer (ITO film) formed had a surface resistance of $2 \times 10^2$ Ω/square, and the second undercoat layer formed had a surface resistance of $4 \times 10^2$ Ω/square.

The transparent laminated conductive films (samples) of the examples and the comparative examples were evaluated as described below. The results are shown in Tables 1 and 2.

(Surface Resistance of ITO Film)

The surface electric resistance (Ω/square) of the ITO film was measured using a two-terminal method.

(Resistance Value Between Patterned ITO Film Portions)

The electric resistance (Ω) between portions of the patterned ITO film, which were each independently existing, was measured with a tester, and whether they were insulated from one another or not was evaluated. A resistance measurement of $1 \times 10^6 \Omega$ or more was evaluated as insulating. The tester used was a digital tester CDM-2000D manufactured by Custom.

(Light Transmittance)

The visible light transmittance was measured at a light wavelength of 550 nm using a spectroscopic analyzer UV-240 manufactured by Shimadzu Corporation.

(Average Reflectance at 450 to 650 nm and Reflection Y Value)

A reflection spectrum was measured at a reflection incidence angle of 10° using a spectrophotometer U4100 manufactured by Hitachi Ltd. in an integrating sphere measurement mode, and the average reflectance and Y value in the range of 450 to 650 nm were calculated. A light blocking layer was formed using a black color spray on the back side (hard coat layer side) of the transparent laminated conductive film (sample), and the measurement was performed in a state where almost no light was reflected or came in from the back side of the sample. For the calculation of the reflected colors, the standard light $D_{65}$ according to JIS Z 8720 was used when the measurement was performed under the 2-degree visual field conditions. The measurement of the average reflectance and Y value was performed on the patterned portion (ITO film) and the non-patterned portion (etched portion), respectively. The difference in reflectance between the patterned and non-patterned portions (Δ(reflectance)) and the difference in Y value between them (Δ(Y value)) are shown together in Table 2.

(Evaluation of Appearance)

The sample was placed on a black board such that the transparent conductor layer side faced upward, and whether the patterned and non-patterned portions were distinguishable from each other or not was visually evaluated according to the criteria below.

⊙: The patterned portion is difficult to distinguish from the non-patterned portion;

○: The patterned portion is slightly distinguishable from the non-patterned portion; and x: The patterned portion is clearly distinguishable from the non-patterned portion.

TABLE 1

| | Composition of Transparent Conductive Layer and AC Layer (thickness: nm) | | Optical Thickness (nm) of Transparent Conductive Layer and AC Layer | | | Surface Resistance (Ω/square) | Resistance between Portions with Pattern (Ω) | Visible Light Transmittance (%) |
|---|---|---|---|---|---|---|---|---|
| | Patterned Portion | Non-Patterned Portion | Patterned Portion | Non-Patterned Portion | Difference (Δnd) | | | |
| Example 1 | ITO (22 nm)/Second AC (33 nm)/First AC (185 nm) | First AC (185 nm) | 377 | 285 | 92 | 300 | >1 × 10$^{12}$ | 90.5 |
| Example 2 | ITO (22 nm)/Second AC (33 nm)/First AC (185 nm) | Second AC (33 nm)/First AC (185 nm) | 377 | 333 | 44 | 300 | >1 × 10$^{12}$ | 89.5 |
| Example 3 | ITO(22 nm)/First AC (35 nm) | First AC (35 nm) | 98 | 54 | 44 | 300 | >1 × 10$^{12}$ | 89.0 |
| Example 4 | ITO (22 nm)/Second AC (33 nm)/First AC (150 nm) | First AC (150 nm) | 323 | 231 | 92 | 300 | >1 × 10$^{12}$ | 89.0 |
| Example 5 | ITO (22 nm)/Second AC (33 nm)/First AC (150 nm) | Second AC (33 nm)/First AC (150 nm) | 323 | 279 | 44 | 300 | >1 × 10$^{12}$ | 89.0 |
| Comparative Example 1 | ITO(22 nm) | None | 44 | — | — | 300 | >1 × 10$^{12}$ | 87.0 |
| Comparative Example 2 | ITO (22 nm)/Second AC (60 nm)/ITO (30 nm) | Second AC (60 nm)/First AC (30 nm) | 192 | 148 | 44 | 150 | 1 × 10$^{3}$ | 92.0 |

In Table 1, AC (layer) represents "undercoat layer."

TABLE 2

| | Average Reflectance (%) at 450-650 nm | | Y Value | | | | |
|---|---|---|---|---|---|---|---|
| | Patterned Portion | Non-Patterned Portion | Patterned Portion | Non-Patterned Portion | Δ(Reflectance) (%) | Δ(Y value) | Appearance Evaluation |
| Example 1 | 6.9 | 7.1 | 6.8 | 7.3 | 0.6 | 0.5 | ⊙ |
| Example 2 | 6.9 | 5.8 | 6.8 | 6.2 | 1.0 | 0.6 | ⊙ |
| Example 3 | 7.6 | 5.9 | 7.4 | 5.9 | 1.7 | 1.5 | ○ |
| Example 4 | 8.2 | 6.1 | 8.3 | 6.4 | 2.1 | 1.8 | ○ |
| Example 5 | 8.2 | 6.2 | 8.3 | 6.1 | 2.0 | 2.1 | ○ |
| Comparative Example 1 | 10.2 | 7.2 | 10.0 | 7.6 | 3.2 | 2.5 | X |
| Comparative Example 2 | 3.5 | 7.9 | 2.9 | 8.2 | 4.4 | 5.3 | X |

It is apparent from Tables 1 and 2 that the transparent conductive films according to the invention each have a good appearance, even though they each have a patterned transparent conductor layer.

What is claimed is:

1. A transparent conductive film, comprising:
   a transparent film substrate;
   a transparent conductor layer provided on one side of the transparent film substrate; wherein the transparent conductor layer is patterned and
   at least two undercoat layers interposed between the transparent film substrate and the patterned transparent conductor layer;
   wherein:
   the at least two undercoat layers are non-patterned, and
   the first undercoat layer of the at least two undercoat layers is first from the transparent film substrate, has a thickness of 100 nm to 220 nm and is made of an organic material.

2. The transparent conductive film according to claim 1, wherein an undercoat layer of the at least two undercoat layers that is most distant from the transparent film substrate is made of an inorganic material.

3. The transparent conductive film according to claim 2, wherein the undercoat layer is a $SiO_2$ film.

4. The transparent conductive film according to claim 1, wherein there is a difference of 0.1 or more between the refractive indices of the patterned transparent conductor layer and the at least two undercoat layers.

5. The transparent conductive film according to claim 1, wherein
   the first undercoat layer from the transparent film substrate has a refractive index (n) of 1.5 to 1.7 and a thickness (d) of 100 nm to 220 nm,
   a second undercoat layer of the at least two undercoat layers is second from the transparent film substrate and has a refractive index (n) of 1.4 to 1.5 and a thickness (d) of 20 nm to 80 nm,
   the patterned transparent conductor layer has a refractive index (n) of 1.9 to 2.1 and a thickness (d) of 15 nm to 30 nm, and
   the total of the optical thicknesses (n×d) of the respective layers is from 208 nm to 554 nm.

6. The transparent conductive film according to claim 5, wherein there is a difference ($\Delta nd$) of 40 nm to 130 nm between
   the total of the optical thicknesses of the patterned transparent conductor layer and the at least two undercoat layers and
   the optical thickness of the at least two undercoat layers in the non-patterned portion.

7. A transparent conductive film body, comprising:
   at least two films of the transparent conductive film according to claim 1 that are laminated with a transparent pressure-sensitive adhesive layer interposed therebetween,
   wherein the patterned transparent conductor layer of the at least two films of the transparent conductive film according to claim 1 is present on the outer side of the transparent conductive film body.

8. A transparent conductive film body, comprising:
   the transparent conductive film according to claim 1, and
   a transparent substrate that is bonded to one side of the transparent conductive film according to claim 1 with a transparent pressure-sensitive adhesive layer interposed therebetween,
   wherein the patterned transparent conductor layer of the transparent conductive film is present on the outer side of the transparent conductive film body.

9. The transparent conductive film according to claim 1, which is for use in a touch panel.

10. The transparent conductive film according to claim 9, wherein the touch panel is a capacitive coupling type touch panel.

11. A method for producing the transparent conductive film according to claim 1, comprising:
    preparing a transparent conductive film comprising a transparent film substrate and a transparent conductor layer formed on one side of the transparent film substrate with at least two undercoat layers interposed therebetween; and
    patterning the transparent conductor layer by etching with an acid.

12. The method according to claim 11, further comprising the step of crystallizing the patterned transparent conductor layer by annealing, after the step of patterning the transparent conductor layer.

13. A touch panel, comprising the transparent conductive film according to claim 1.

14. A transparent conductive film, comprising:
    a transparent film substrate;
    a transparent conductor layer provided on both sides of the transparent film substrate;
    wherein the transparent conductor layer is patterned and at least two undercoat layers interposed between the transparent film substrate and the patterned transparent conductor layer;
    wherein:
    the at least two undercoat layers are non-patterned, and
    the first undercoat layer of the at least two undercoat layers is first from the transparent film substrate, has a thickness of 100 nm to 220 nm and is made of an organic material.

15. The transparent conductive film according to claim 14, wherein an undercoat layer of the at least two undercoat layers that is most distant from the transparent film substrate is made of an inorganic material.

16. The transparent conductive film according to claim 15, wherein the undercoat layer is a $SiO_2$ film.

17. The transparent conductive film according to claim 14, wherein there is a difference of 0.1 or more between the refractive indices of the transparent conductor layer and the at least two undercoat layers.

18. The transparent conductive film according to claim 14, wherein
    the first undercoat layer from the transparent film substrate has a refractive index (n) of 1.5 to 1.7 and a thickness (d) of 100 nm to 220 nm,
    a second undercoat layer of the at least two undercoat layers is second from the transparent film substrate and has a refractive index (n) of 1.4 to 1.5 and a thickness (d) of 20 nm to 80 nm,
    the patterned transparent conductor layer has a refractive index (n) of 1.9 to 2.1 and a thickness (d) of 15 nm to 30 nm, and
    the total of the optical thicknesses (n×d) of the respective layers is from 208 nm to 554 nm.

19. The transparent conductive film according to claim 18, wherein there is a difference ($\Delta nd$) of 40 nm to 130 nm between the total of the optical thicknesses of the patterned transparent conductor layer and the at least two undercoat layers and the optical thickness of the at least two undercoat layers in the non-patterned portion.

20. A method for producing the transparent conductive film according to claim 14, comprising:

preparing a transparent conductive film comprising a transparent film substrate and a transparent conductor layer formed on both sides of the transparent film substrate with at least two undercoat layers interposed therebetween; and patterning the transparent conductor layer by etching with an acid.

* * * * *